United States Patent
Lin

(10) Patent No.: US 6,929,861 B2
(45) Date of Patent: Aug. 16, 2005

(54) ANTI-REFLECTIVE GLASS SURFACE WITH IMPROVED CLEANABILITY

(75) Inventor: Juei-Hua Lin, New Brighton, MN (US)

(73) Assignee: Zuel Company, Inc., St. Paul, MN (US)

( * ) Notice: Subject to any disclaimer, the term of this patent is extended or adjusted under 35 U.S.C. 154(b) by 110 days.

(21) Appl. No.: 10/091,710

(22) Filed: Mar. 5, 2002

(65) Prior Publication Data

US 2003/0170459 A1 Sep. 11, 2003

(51) Int. Cl.$^7$ ............................................. C03C 15/00
(52) U.S. Cl. ...................... 428/410; 428/149; 428/156; 428/426; 65/31
(58) Field of Search ................... 428/410, 156, 428/149, 426; 65/31; 156/651, 663

(56) References Cited

U.S. PATENT DOCUMENTS

| | | | |
|---|---|---|---|
| 276,894 A | 5/1883 | Schulze-Berge | 216/173 |
| 1,482,793 A | 2/1924 | Hartmann | 501/127 |
| 1,565,869 A | 12/1925 | Straw | 156/635 |
| 1,740,376 A | 12/1929 | Smith | 252/79.3 |
| 1,760,427 A | 5/1930 | Matlock, Jr. | 156/651 |
| 1,772,965 A | 8/1930 | Smith | 252/79.3 |
| 1,777,321 A | 10/1930 | Meth | 156/663 |
| 1,861,577 A | 6/1932 | Mattman | |
| 2,118,386 A | 5/1938 | Swinehart | 156/659.1 |
| 2,328,533 A | 8/1943 | Walker | 252/79.3 |
| 2,337,460 A | 12/1943 | French | 117/124 |
| 2,348,704 A | 5/1944 | Adams | 88/1 |
| 2,354,091 A | 7/1944 | Sharpe et al. | 41/42 |
| 2,446,060 A | 7/1944 | Pray et al. | 252/101 |
| 2,359,072 A | 9/1944 | Adams | 41/42 |
| 2,367,704 A | 1/1945 | Walker | 88/14 |
| 2,370,214 A | 2/1945 | Walker | 41/42 |
| 2,445,238 A | 7/1947 | Nicoll et al. | 41/42 |
| 2,426,541 A | 8/1947 | Williams | 41/42 |
| 2,461,840 A | 2/1949 | Nicoll | 41/42 |
| 2,486,431 A | 11/1949 | Nicoll et al. | 41/42 |
| 2,490,263 A | 12/1949 | Gaiser et al. | 117/106 |
| 2,490,662 A | 12/1949 | Thomsen | 41/42 |
| 2,529,703 A | 11/1950 | Nicoll | 41/42 |

(Continued)

FOREIGN PATENT DOCUMENTS

| | | |
|---|---|---|
| CA | 472170 | 3/1951 |
| GB | 1462618 | 1/1977 |

OTHER PUBLICATIONS

US 4,379,180, 4/1983, Baglin et al. (withdrawn)

Primary Examiner—Terrel Morris
Assistant Examiner—Andrew T Piziali
(74) Attorney, Agent, or Firm—Darby & Darby

(57) ABSTRACT

A low reflectance glass surface with improved cleanability is disclosed which includes a particular combination of surface structures which produce a low reflectance yet high clarity glass. The surface structure includes a plurality of islands distributed at a density of about 60 to about 10,000 islands per square millimeter. The glass surface also includes a skeletalized silica structure of about 100 to about 400 angstroms in diameter uniformly distributed over the surface. By combining the various surface structures on one piece of glass, unique properties of low reflectance yet high clarity are provided, which is particularly suitable for use in picture frames where any distortion would distract from viewing a picture contained therein and also in computer or t.v. screens where distortion or glare could produce operator fatigue or stress. The glass structure is achieved by a process which is readily adaptable to existing production lines without requiring major modifications. Consequently, the low glare high clarity glass can be produced economically, allowing use in applications not previously adaptable to the highly expensive anti-reflection glass previously available.

4 Claims, 8 Drawing Sheets

U.S. PATENT DOCUMENTS

| | | | |
|---|---|---|---|
| 2,622,016 A | 12/1952 | Gilstrap et al. | 41/42 |
| 2,655,439 A | 10/1953 | Floersch | 41/42 |
| 2,749,794 A | 6/1956 | O'Leary | 88/1 |
| 2,955,927 A | 10/1960 | Ogata | 41/42 |
| 2,966,432 A | 12/1960 | Buck | 134/41 |
| 2,989,384 A | 6/1961 | Allen et al. | 41/42 |
| 2,999,013 A | 9/1961 | Meth | 41/42 |
| 3,023,139 A | 2/1962 | Tetterode | 156/24 |
| 3,024,148 A | 5/1962 | Schaer | 156/17 |
| 3,046,084 A | 7/1962 | Veazie | 18/54 |
| 3,107,188 A | 10/1963 | Hancock | 156/17 |
| 3,203,884 A | 8/1965 | Gruss et al. | 204/140.5 |
| 3,220,899 A | 11/1965 | Leonard | 156/23 |
| 3,284,181 A | 11/1966 | Harrell et al. | 65/31 |
| 3,294,603 A | 12/1966 | Myers | 156/24 |
| 3,310,495 A | 3/1967 | Masuda et al. | 252/79.1 |
| 3,326,715 A | 6/1967 | Twells | 117/124 |
| 3,374,130 A | 3/1968 | Junge et al. | 65/31 |
| 3,374,141 A | 3/1968 | Junge et al. | 65/31 |
| 3,383,255 A | 5/1968 | Rossi et al. | 156/17 |
| 3,485,687 A | 12/1969 | Chapman et al. | 156/4 |
| 3,490,982 A | 1/1970 | Sauveniere et al. | 161/1 |
| 3,514,407 A | 5/1970 | Missel | 252/79.3 |
| 3,546,037 A | 12/1970 | Sälzle | 156/24 |
| 3,551,228 A | 12/1970 | Meth | 156/24 |
| 3,560,381 A | 2/1971 | Nelson | 156/24 |
| 3,565,707 A | 2/1971 | Radimer et al. | 156/3 |
| 3,616,098 A | 10/1971 | Falls | 161/1 |
| 3,647,583 A | 3/1972 | Johannes | 156/6 |
| 3,712,711 A | 1/1973 | Adachi | 350/164 |
| 3,753,815 A | 8/1973 | Burton et al. | 156/6 |
| 3,782,915 A | 1/1974 | Filbert et al. | 65/30 |
| 3,788,914 A | 1/1974 | Gumbelevicius et al. | 156/18 |
| 3,859,222 A | 1/1975 | Squillace et al. | 252/79.3 |
| 3,864,111 A | 2/1975 | Kemp | 65/31 |
| 3,934,961 A | 1/1976 | Itoh et al. | 350/164 |
| 3,997,690 A | 12/1976 | Chen | 427/162 |
| 4,019,884 A | 4/1977 | Elmer et al. | 65/30 |
| 4,046,619 A | 9/1977 | Rice et al. | 156/645 |
| 4,053,351 A | 10/1977 | DeForest et al. | 156/661 |
| 4,055,458 A | 10/1977 | Niederprum et al. | 156/663 |
| 4,061,486 A | 12/1977 | Jahn | 65/31 |
| 4,073,579 A | 2/1978 | Deeg et al. | 351/169 |
| 4,080,188 A | 3/1978 | Doddato et al. | 65/31 |
| 4,086,074 A | 4/1978 | Minot et al. | 65/31 |
| 4,107,388 A | 8/1978 | Gambaretto et al. | 428/428 |
| 4,114,983 A | 9/1978 | Maffitt et al. | 350/164 |
| 4,153,654 A | 5/1979 | Maffitt et al. | 264/1 |
| 4,273,826 A | 6/1981 | McCollister et al. | 428/336 |
| 4,332,649 A | 6/1982 | Sälzle | 204/98 |
| 4,340,276 A | 7/1982 | Maffitt et al. | 350/164 |
| 4,372,987 A | 2/1983 | Ganner et al. | 427/42 |
| 4,389,233 A | 6/1983 | Kurosaki et al. | 65/31 |
| 4,427,488 A | 1/1984 | Servais et al. | 156/663 |
| 4,434,191 A | 2/1984 | Cook et al. | 427/165 |
| 4,446,171 A | 5/1984 | Thomas | 427/160 |
| 4,448,635 A | 5/1984 | Kuiken et al. | 156/637 |
| 4,460,621 A | 7/1984 | Pearlman | 427/64 |
| 4,486,541 A | 12/1984 | Gliemeroth et al. | 501/13 |
| 4,505,781 A | 3/1985 | Cozac et al. | 156/640 |
| 4,508,834 A | 4/1985 | Gliemeroth et al. | 501/73 |
| 4,511,614 A | 4/1985 | Greeson et al. | 428/141 |
| 4,528,010 A | 7/1985 | Edahiro et al. | 65/18.1 |
| 4,535,026 A | 8/1985 | Yoldas et al. | 428/428 |
| 4,545,514 A | 10/1985 | Toy | 156/631 |
| 4,545,918 A | 10/1985 | Pralus | 252/142 |
| 4,554,046 A | 11/1985 | Taguchi et al. | 156/637 |
| 4,555,304 A | 11/1985 | Sälzle | 156/663 |
| 4,562,161 A | 12/1985 | Mennemann et al. | 501/59 |
| 4,578,100 A | 3/1986 | Breininger | 65/60.8 |
| 4,588,540 A | 5/1986 | Kiefer et al. | 264/43 |
| 4,606,747 A | 8/1986 | Steinhoff | 65/31 |
| 4,624,729 A | 11/1986 | Bresciani et al. | 156/345 |
| 4,636,439 A | 1/1987 | Breininger | 428/428 |
| 4,640,699 A | 2/1987 | Ohmi et al. | 65/3.15 |
| 4,944,986 A | 7/1990 | Zuel | 428/156 |
| 5,120,605 A * | 6/1992 | Zuel et al. | 428/410 |

* cited by examiner

ANTI-REFLECTIVE GLASS SURFACE WITH IMPROVED CLEANABILITY

FIELD OF THE INVENTION

This invention relates to the surface structure of anti-reflective glass and more particularly to a surface structure of glass which has a low reflectance while attaining high clarity and is easy to clean. This invention also relates to methods of producing such surface structures of glass.

BACKGROUND OF THE INVENTION

It is known that glass can be treated to reduce glare (reflection) by making use of two different physical phenomena, diffusion and anti-reflection. Diffusion refers to the phenomenon by which reflections of light are scattered in various directions, so that the intensity of the reflections in the direction of a viewer is reduced, but the total hemispherical reflection remains the same. "Diffusion etching" treats a glass surface to increase the diffusion effect. Reducing glare by diffusion may be achieved by roughening the glass surface using physical or chemical means, e.g., by grinding, sand blasting, or acid etching.

Frosted glass is a typical light diffusion material which is usually made by acid etching of the glass surface. However, frosted glass cannot be used in applications where high clarity is required along with low glare. Examples of such applications are in picture frames; a protective surface for a cathode ray (picture) tube in television receivers; or as a screen for computer monitors. The above applications require a high level of clarity to prevent distortion of the images and colors displayed by a picture, such as a photograph, or to prevent detracting from the visual appreciation of the image. It is also desirable and important to reduce glare to prevent reflected light from interfering with observation of the picture or photograph contained therein. The reduction of glare is of particular importance in computer monitors where fatigue or stress may be induced by unwanted reflections. At the same time, image clarity must be maintained to minimize distortion. Distortion can cause eye strain if the image is viewed for long periods for time. Various attempts have been made to improve the light transmission qualities of frosted glass. However, the degree of clarity that has been achieved in such products has not been sufficient to enable them to be used in picture frames or in monitor screens.

Anti-reflection glass uses the principal of destructive interference. This results when incident light is reflected from an anti-reflection surface of a glass sheet. Trapping the light at particular wavelengths results is an actual reduction in the total light reflected. This includes the light that is directed toward the viewer. Although the total light reflected is reduced, the transmission (clarity) is increased. Such anti-reflection effects are usually achieved by applying one or more coatings to the sheet glass surface. Such coatings may be an inorganic metal oxide, which may be deposited by vacuum deposition, sputtering or sol gel deposition. However, anti-reflection processes are quite costly and therefore the treated glass is not economical for use in high-volume applications such as in picture frames or for replacing common glass. Consequently, low glare, high clarity sheet glass has not been generally available for use in these applications due to either poor clarity or high cost.

U.S. Pat. No. 5,120,605 to Zuel et al. discloses combining surface structures through both diffusion etching and anti-reflective etching to provide a low reflectance, high clarity glass at a low cost. However, such glass is difficult to clean using common household glass cleaners. Grease marks, which commonly occur on glass surfaces such as picture frames and cathode ray tubes, are especially difficult to remove without special high-strength glass cleaner. Such specialty high-strength glass cleaners are not normally available to the general public and are expensive.

SUMMARY OF THE INVENTION

It is an object of the present invention to provide a glass sheet or pane having a particular surface structure which yields high clarity and low reflectivity of incident light, while minimizing processing costs. In addition, the glass surface can be easily cleaned using common household glass cleaners.

Another object of the present invention is to provide a process for producing a particular glass surface structure having high clarity and low reflectivity properties at a cost that is competitive with the cost of common glass and can be easily cleaned using common household glass cleaners.

The present invention provides a high clarity, low reflectivity glass having at least one glass surface including a plurality of islands extending across the surface of the glass. The islands have a density of about 60 to about 10,000 islands per square millimeter, and are about 10 to about 200 micrometers in diameter. The islands extend across the entire surface of the glass in such a distribution that they provide a decreased reflectance of incident light across the surface of the glass. The glass surface also includes a skeletized silica structure extending uniformly over the surface of the glass. The skeletized structure is about 100 to about 400 angstroms has openings of about 100 to about 200 angstroms in diameter uniformly distributed throughout. The density of the skeletized structure is about 50 to about 70 skeletal structures per 200 nanometers square of the glass surface.

The preferred process for producing the inventive structure on the surface of a glass generally includes multiple steps. First, a glass member that includes one or more light-reflecting surfaces is provided. At least that surface of the glass member is exposed to an acid solution to remove weathered layers. Then the glass member is rinsed in a neutral solution. Next, the glass member is dipped in an aqueous solution containing a strong fluoride ion agent, a weak fluoride ion agent and a moderator. The glass member remains in the aqueous solution for a time period and at a solution temperature sufficient to produce islands on the glass surface. The islands may be distributed at a density of about 60 to about 10,000 islands per square millimeter. The glass is then rinsed with a cleansing solution. These steps produce a diffusion etched surface on the exposed surface of the glass member. Lastly, the diffusion etched surface is immersed in an anti-reflection acid solution. The glass member is immersed for a time sufficient to produce a skeletized silica structure extending uniformly over the surface of the glass. The skeletized structure may be about 100 to about 400 angstroms diameter and having openings of about 100 to about 200 angstroms in diameter uniformly distributed throughout.

BRIEF DESCRIPTION OF THE DRAWINGS

The above and still further objects, features and advantages of the present invention will become apparent upon consideration of the following detailed description of a specific embodiment therefor, especially when taken in conjunction with the accompanying drawings wherein the reference figures are utilized to designate like components, and wherein.

DETAILED DESCRIPTION OF THE PREFERRED EMBODIMENT

The present invention provides an inexpensive but nonetheless effective anti-reflective, low glare, glass product that is easily cleaned using common household glass cleaners. This glass is particularly useful as a protective cover or shield in picture frames or as a screen for cathode ray tubes.

Figure 1:
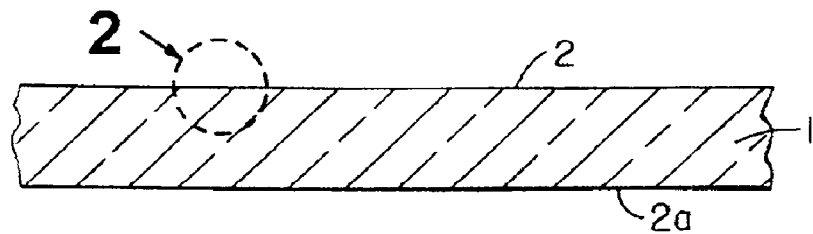
FIG. 1 is an illustrative side view of an untreated glass sheet.

FIG. 1 is an illustration of a glass sheet, prior to any treatment according to the present invention. The sheet 1 includes two smooth surfaces 2 and 2a. For ease in illustration, only one surface 2 will be discussed. Of course, one or more surfaces of a glass article may include the surface structure of the present invention.

One preferred type of glass usable in the invention is typically termed "soda-lime" glass. In general, soda-lime glass contains a percentage of sodium oxide and calcium oxide dispersed in silicon dioxide (silica), which forms the major component of the glass. Generally, during the etching process, the soda-lime components are dissolved and removed by the etching solution leaving the skeletized glass structure remaining. However, depending on the potency of the etching solution and the duration of the etching treatment, the silica itself may also be dissolved to a certain extent. Soda-lime glasses useful in the invention may contain from about 5 to about 45 percent by weight of soda-lime with about 20 to about 25 percent by weight soda-lime preferred. While such glasses are preferred for use in the present invention, it will be understood by those skilled in the art that sheets and shapes of various other types of glass well known to the art may be processed to achieve the unique glass structure described herein and to thereby acquire the high clarity/low reflectivity/cleaning properties taught by the present invention. For example, glasses containing other alkali or mineral oxides such as potassium oxides, barium oxides, strontium oxides and aluminum oxides, with or without a small percentage of lead, may also be used. Also, glasses which have been tempered using conventional tempering treatments yield excellent results when employed as starting materials in the present invention. Consequently, the discussion of soda-lime glass in the instant description of the invention is exemplary and does not limit the scope of the invention thereto.

In order to form the surface structure of the invention on soda-lime glass, a plurality of steps must be undertaken in sequence and under closely controlled conditions. While glass used for picture frames or monitor screens are the principal application of interest, the anti-reflective glass of the present invention is useful in several other applications. These other, non-limiting, applications include windshields for motor vehicles, boats and aircraft, windows for residential and commercial structures, table tops, and other glass structures where high clarity and low reflectance is desired.

The process of the present invention can be used with a glass sheet or other configurations of glass articles, such as curved or multi-faceted glass. However, glass sheets are the most common application. Where only one surface of a glass sheet is to receive the inventive anti-reflective treatment, the opposite surface may be masked or protected from the treating solution. The glass is protected by applying a protective coating to the surface prior to contacting the sheet with any of the treating solutions of the invention. Suitable protective coatings include organic materials that do not react with the treating acid solutions, for example, PVC, polyethylene or polypropylene.

Prior to undergoing any etching, the surface of the glass must be cleaned to remove any oils, greases and any other contaminants which may interfere with the etching process. Any suitable heavy duty industrial glass cleansing solution may be used as a cleansing agent, such as, for example, a 50/50 (volume) solution of ammonia and water. The glass to be treated is generally immersed in the cleaning solution at about 45° to about 65° C. to assist the cleaning action, with the solution agitated for about 10 minutes. After removal from the cleansing solution, the glass sheet is then rinsed with clean water, at room temperature.

The surface of the glass then undergoes a pre-etching step to remove a weathered surface layer which is usually comprised of surface oxides. This enhances the wetting with the treatment chemicals. A typical soda-lime glass sheet, including about 23% soda-lime, may be pre-etched in an acid solution comprising about 0.5 to about 12.0% hydrofluoric acid, with about 2 to about 4% preferred.

After the pre-etching step, the glass is rinsed with water at about 25° C. and thereafter diffusion etched using a diffusion etching solution, the glass treated for between 15 seconds to 25 minutes depending on temperature and concentration. The aqueous solution that may diffusion etch may include a strong fluoride ion agent, such as hydrogen fluoride, and a weak fluoride ion agent, such as ammonium bifluoride or ammonium fluoride. Both ion agents may be combined with a moderator which may control the activity of the fluoride ions in solution. The moderator may be an organic hydroxy group or an "—OR" group containing compound, including at least one hydroxy or "—OR" group where R equals $C_k H_{2k+1}$, and k is any integer which produces a water soluble moderator. For example, compositions may be used which have the formula $C_1 H_m O_n$ where 1 is an integer from 2–12, m is an integer from 4–26 and n is an integer from 2–12. This compound may include from 1 to 12 hydroxy groups or "—OR" groups. Also, compounds having the following formulas may be used:

$C_pH_{2p+2}O_{p-1}$, $C_pH_{2p+2}O_{p-2}$, $C_pH_{2p+2}O_{p-3}$, $C_pH_{2p+2}O_{p-4}$, $C_pH_{2p}O_p$, $C_pH_{2p}O_{p-}$, $C_pH_{2p}O_{p-2}$, $C_ph_{2p-2}O_{p+2}$, $C_pH_{2p-2}O_{p+1}$, $C_ph_{2p-2}O_p$, $C_pH_{2p-2}O_{p-2}$, where p is an integer from 2–12 and where from 1 to 12 hydroxy groups or "—OR" groups are present. Specific water soluble moderators include sucrose, glucose, xylose, ethylene glycol, glycerol, diethylene glycol dimethyl ether, diethylene glycol diethyl ether, diethylene glycol monobutyl ether, diethylene glycol monoethyl ether and sorbitol.

In the preferred embodiment, the moderator is sorbitol ($C_6H_{14}O_6$, with 6 hydroxyl groups). One embodiment of an aqueous solution that can diffusion etch includes hydrofluoric acid, ammonium bifluoride and sorbitol. The aqueous solution of this embodiment may contain from 30 to 550 milliliters per liter of 70% by weight hydrofluoric acid, 30 to 250 grams per liter of ammonium bifluoride, and about 250 to 850 grams per liter of sorbitol.

The preferred embodiment of the diffusion etching aqueous solution comprises 430 ml/L of 70% hydrofluoric acid, 80 g/L of ammonium bifluoride and 500 g/L of sorbitol. The aqueous solution is applied to the glass, preferably by immersion, for 30 seconds at 20° C. The sorbitol, as moderator, serves to retard the etching effect of the acid constituent. As the amount of sorbitol is increased in the bath, the amount of etching of the glass surface that is achieved in a given time period will be reduced. Similarly, as the quantity of sorbitol is decreased, the etching action of the bath is enhanced.

Generally, the glass is treated by contacting the sheet with the aqueous solution. In one embodiment, the sheet is immersed in the solution, which can be either in a one dip or multi dip operation. The time per dip may range from seconds to minutes depending on the concentrations, processing temperatures, and glass to be treated. It is preferable to utilize multiple dips for providing a finer etched structure with greater uniformity. However, the choice of whether a one-dip or a multi-dip process is used may be determined by the user.

Control of the processing temperatures is very important to achieving the proper surface structure in the present invention. Generally, temperatures between 0° to 35° C. are preferred for the diffusion etching treatment. While such etching may be carried out above and below this range, below 0° C. the reaction rate is unnecessarily slowed, while above 35° C. the reaction rate may cause more severe etching than desired. Generally, the lower temperatures are preferred because at the lower reaction rates, it takes longer to etch the glass, enhancing control of the etching process and therefore providing a more finely etched surface structure which tends to yield a glass with increased clarity.

Figure 2:
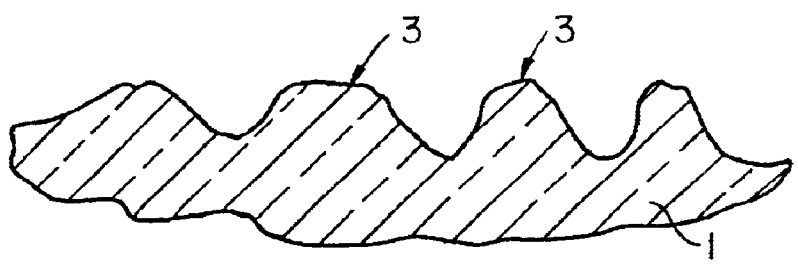
FIG. 2 is an illustrative view of the glass surface structure after the diffusion etching treatment according to the present invention.
Figure 3:
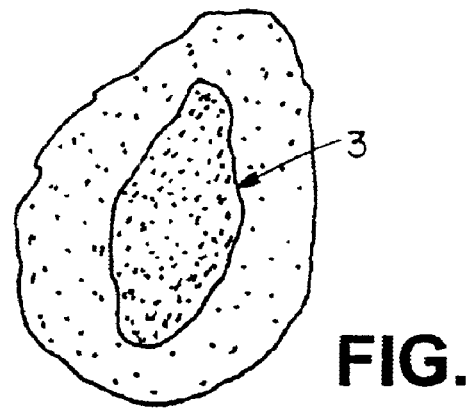
FIG. 3 is an illustrative view of a typical primary raised structures produced on the glass surface.

Referring now to FIG. 2, the first stage of the diffusion etching is shown. The glass surface 2 has been etched to produce a plurality of islands 3, which are randomly distributed over the glass surface. These islands range from about 10 to about 200 micrometers in diameter.

To secure the best anti-reflective characteristics, it is desirable to produce glass surfaces having a plurality of islands, having between about 60 to about 10,000 and preferably 200 to 3,000 and most preferably 250 to 600 islands per square millimeter. The number of islands can be controlled somewhat by varying the time of immersion in the aqueous solution. As the immersion time increases, the number of islands increases. The higher density of islands precludes the formation of a scalloped surface. It has also been found that one technique for controlling the density (number of islands per unit area of glass surface) of islands is to vary the concentration of sorbitol within the aqueous solution. The number of islands per unit area of glass surface increases as the concentration of sorbitol is increased.

The glass must be treated within relatively precise temperature, time and concentration parameters to achieve the described diffusion surface. Examples of various compositions and parameters usable for achieving the described diffusion surface structure are disclosed in Table 1.

TABLE 1

| Bath Parameters | Bath No. 1 | Bath No. 2 |
| --- | --- | --- |
| Hydrofluoric Acid 70% (ml/l) | 40 | 465 |
| Ammonium Bifluoride (g/l) | 150 | 80 |
| Sorbitol (g/l) | 530 | 490 |
| Immersion Time (No. of Dips & Min. per Dip) | 4 Dips at 3 Minutes per Dip | 1 Dip at 0.4 Minutes per Dip |
| Temperature (° C.) | 6.11 | 22.22 |

After completing the diffusion etching treatment described above, the glass surface is generally rinsed in an agitated solution of water at 25° C. for 5 minutes. The glass surface is then treated to provide a fine, irregular anti-reflective (AR) structure on the glass surface. Immersion of the glass into an anti-reflection acid solution creates skeletal structure consisting of ultra fine pores in the surface of the glass. The ultra fine pores cover the entire surface of the islands that were previously created by the diffusion etching step. This structure now appears somewhat as an interconnecting silica network. The ultra fine pores are between about 100 and about 200 angstroms.

Processes for providing AR surfaces are known in the art, vapor deposition, sol gel deposition and sputtering. All of the above processes are usable with the invention but the preferred embodiment produces the AR structure by acid etching. Acid etching treatment offers the advantage of low cost and is readily adaptable to high volume production operations.

Producing the high clarity, low reflectance glass of the present invention requires treating the already diffusion etched soda-lime glass with an anti-reflection acid solution. The acid solution is prepared by dissolving hydrated silica to saturation in an acid, such as $H_2SO_4$, HCl, $HNO_3$, $H_3PO_4$, or in salts of these acids. A fluoride ion is then added because it is essential that some fluoride ion be present. While hydrogen fluoride (HF) may be used, the preferred embodiment utilizes fluorosilicic acid as the acid component. After dissolution of the hydrated silica to saturation, the solution is filtered to remove the excess silica.

Immersing the glass in a silica supersaturated fluorosilicic acid solution may cause the soda and lime components of the glass to be preferentially etched much faster than the silica components. This acid solution may thereby form a skeletal silica structure. Such etching can be controlled to produce a skeletal surface structure having a refractive index of about 1.23 and an optical thickness of about one quarter wavelength of green light. Such a surface will effectively reduce the reflection due to destructive interference. Generally, the irregular micropore surface achieved has a purplish-brown to brown color (when viewed in daylight). The degree of etching can be controlled to adjust the index of refraction and thickness of the surface layer. A general refractive index of 1.21 to 1.32, with 1.22 to 1.24 preferred, may be obtained. The optical thickness, which is defined as physical thickness times the index of refraction of the skeletonized structure, should be between 125 and 200 nanometers, preferably 138–150 nanometers, with openings of from about 100 to about 200 angstroms and a skeletal structure of about 100 to about 400 angstroms.

The anti-reflective acid solution must be adjusted to the proper strength for the type of glass to be treated. The solutions are tested and compared by potency, termed "solution potency", to determine their strength. The basic solution, for example, hydrated silica/fluorosilicic acid, is taken as having a zero potency. A fluoride ion contributor, such as hydrofluoric acid or fluoride salt, may be added to obtain a positive potency, and a fluoride ion sequestering agent, added to reduce the fluoride ion activity and to attain a negative potency. For example, boric acid may be added to form a boron trifluoride, reducing the fluoride activity of the solution. The units of potency are related to fluoride ion concentration, wherein one milliliter of 1 molar HF per one liter of etching solution increases the potency by one positive unit, while 0.5 ml of 4% boric acid per one liter of etching solution is added to decrease the potency by one negative unit. The potency required may vary depending on the composition of the glass which usually varies from manufacturer to manufacturer. Generally, with soda-lime glass having about 25% soda-lime, the etching potency should be within a range of plus 12 to minus 12, when etched at about 45° C. The optimum etching potency is determined by immersing a number of glass samples in a series of solutions adjusted to a range of potency units. The samples are etched for a particular length of time, usually about 35 to about 70 minutes, with the solution which produces the glass with the best purplish-brown to brown color having the optimum etching potency. Once known, production treatment baths may be adjusted to the potency of that solution.

The anti-reflective acid solution is preferably composed of fluorosilicic acid ($H_2SiF_6$) to about 15% by weight, with hydrated silica added to saturation as previously described and then adjusted for potency. The fluorosilicic acid concentration in the etching solution can be higher or lower than 15% by weight, for example from 5 to 25 percent by weight. At a higher fluorosilicic acid concentration, a shorter time is required for producing the secondary raised and lowered surfaces. The etching temperature may also be adjusted from about 25° C. to about 80° C. with higher temperatures taking less time to produce the skeletonized structure. However, at the higher temperatures, the acid concentration may vary due to evaporation and the solution is considered less stable for production operations. Examples of processing parameters are listed in Table 2.

TABLE 2

| Bath Parameters | Example No. 1 | Example No. 2 |
|---|---|---|
| Fluorosilicic Acid (% wt) | 15 | 15 |
| Hydrated Silica (g/l) | 12* | 12* |
| Hydrofluoric Acid 70% (ml/l) | 0 | 0 |
| Boric Acid (4% ml/l) | 4 | 9 |
| Potency | −8 | −18 |
| Glass Immersion Time (min.) | 46 | 16 |
| Temperature (° C.) | 44 | 60 |

*Dissolved to saturation, excess removed by filtration

Figure 4:
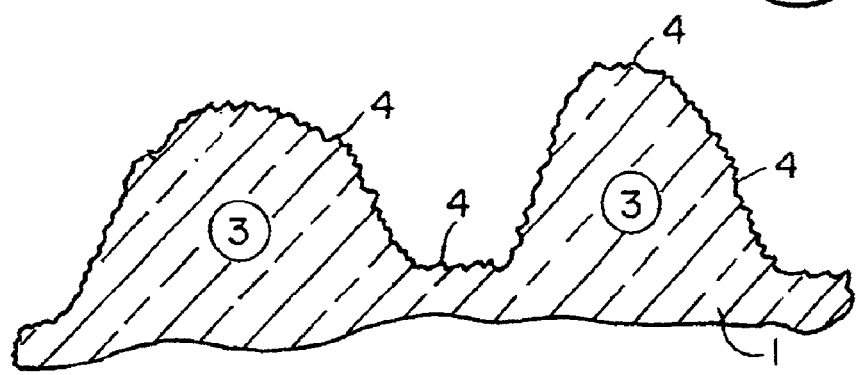
FIG. 4 and is enlarged illustrative views of the glass surface structure after anti-reflectance etching according to the present invention.

FIG. 4 illustrates the cross-sectional enlarged view of the glass treated with diffusion etching followed by anti-reflection etching. The glass 1 includes islands 3. In addition, a silica structure 4 comprising skeletonized silica is integral with the diffusion etched surface. The size of the AR structure is about 100 to about 400 angstroms In diameter with openings of about 100 to about 200 angstroms in diameter. While the precise mechanism is not known, it is believed that the islands cause diffusion to occur without distortion. These islands are all larger than the visible wavelengths of light. These properties are believed to be formed because the density of the structure is low, and because the skeletal silica structure actually reduce the reflection and increases the transmission. This is believed to contribute to the high clarity of the glass. The secondary surfaces attains an optimum refractive index of 1.23, with lowest reflection occurring at ¼ wavelength of green light. Consequently, a combination structure is achieved which optimizes the reflection properties of the glass while minimizing distortion. This structure provides for high clarity, which is particularly applicable to use of the glass in picture frames or computer monitor screens.

Figure 5:
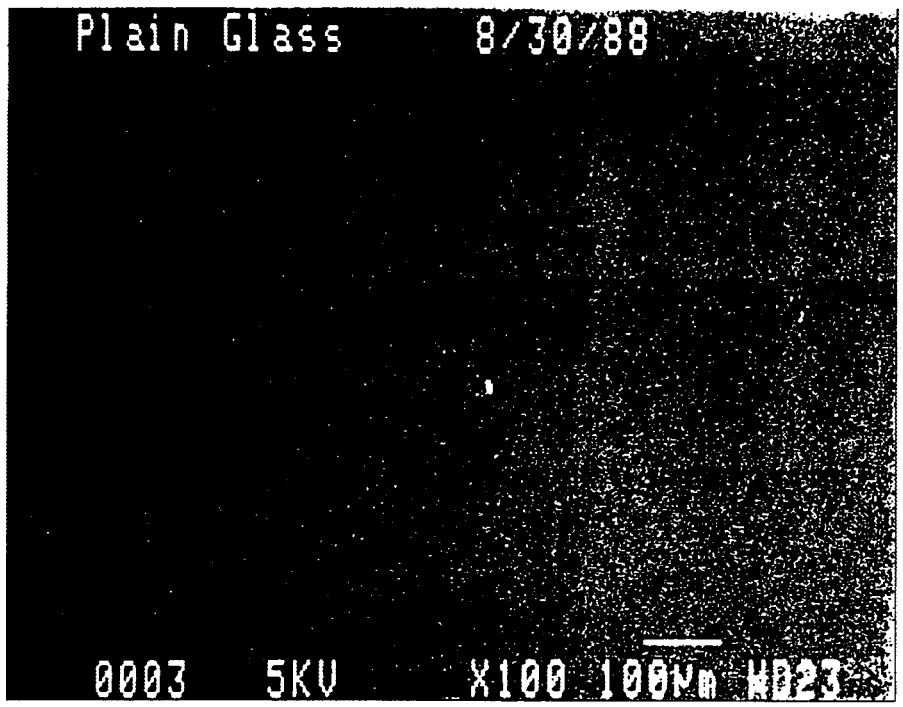
FIG. 5 is a scanning electron micrograph illustrating a prior art glass surface at various stages of the anti-reflective process, including a comparison with a typical diffusion etched surface.
Figure 6:
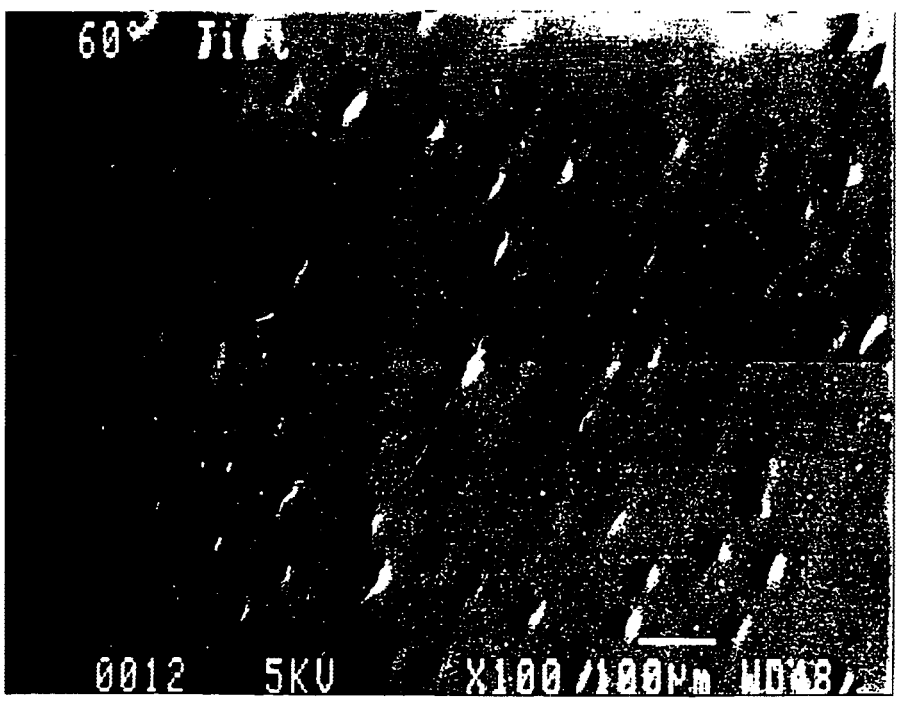
FIGS. 6 through 10 are scanning electron micrographs illustrating a glass surface at various stages of the anti-reflective process of the present invention, including a comparison with a typical diffusion etched surface.
Figure 7:
Figure 8:

The structures described in the above sections and illustrated in the Figures were confirmed using scanning electron micrograph (SEM) pictures of the glass surfaces at various stages of treatment with the present invention. FIGS. 5, 6 and 7, refer to SEM photos showing typical soda-lime glass throughout the treatment process. FIG. 5 illustrates plain glass prior to any treatment. FIG. 6 shows the glass surface after the pre-etch treatment and light-diffusion etching only. Next, FIG. 7 shows a low reflective, high clarity surface structure. All three micrographs were taken at 100× magnification. It is apparent that the plain glass of FIG. 5 is very smooth compared to the etched glasses of FIGS. 6 and 7. A typical diffusion etched glass of the prior art is shown in FIG. 8. A comparison of FIGS. 7 and 8 show substantially different surface structures between the two.

Figure 9:
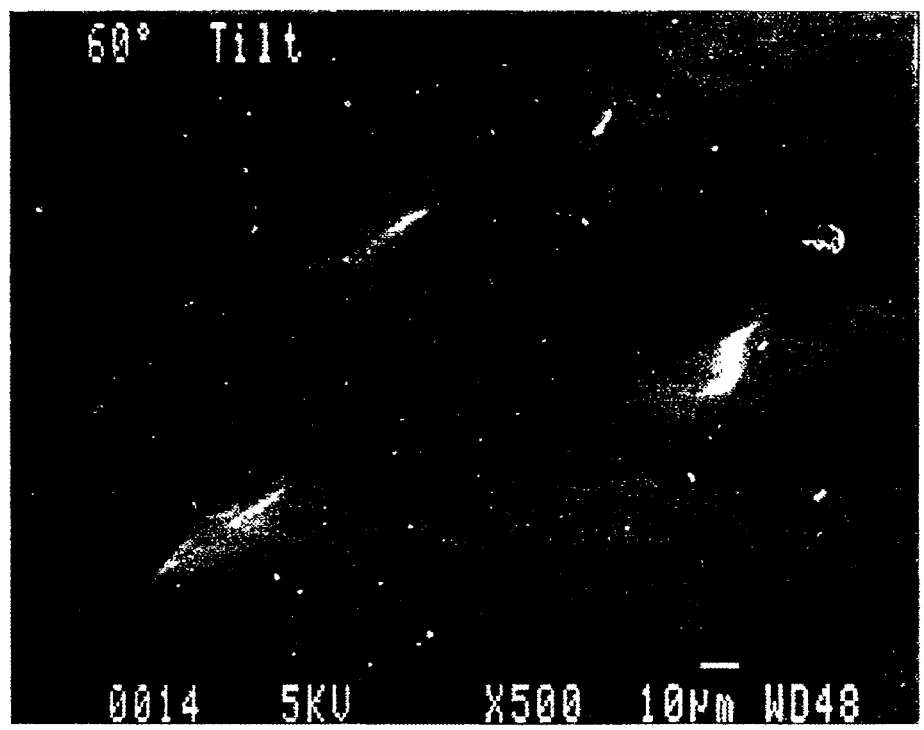
Figure 10:

FIGS. 9 and 10 are micrographs, at 500× magnification, that were taken after a light-diffusion step. FIG. 9 illustrates a diffusion surface island without spikes and FIG. 10 illustrates a diffusion island with spikes.

Figure 11:
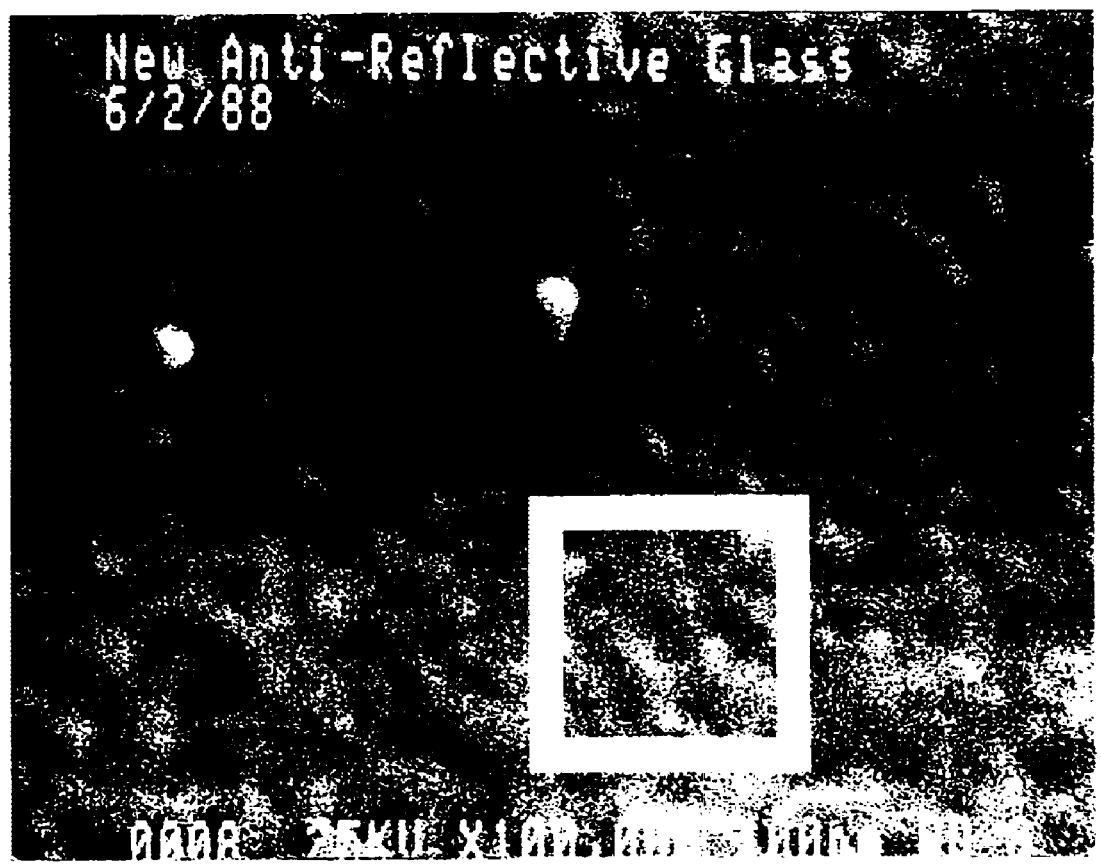
FIG. 11 is scanning electron micrograph illustrating a skelitized structure of a prior art glass surface.

Referring to FIG. 11, a view of a surface structure illustrating the skeletal silica structure across the glass surface is shown using a scanning electron micrograph at 100,000×. This illustrates the skeletal structure described in FIG. 4.

Figure 12:
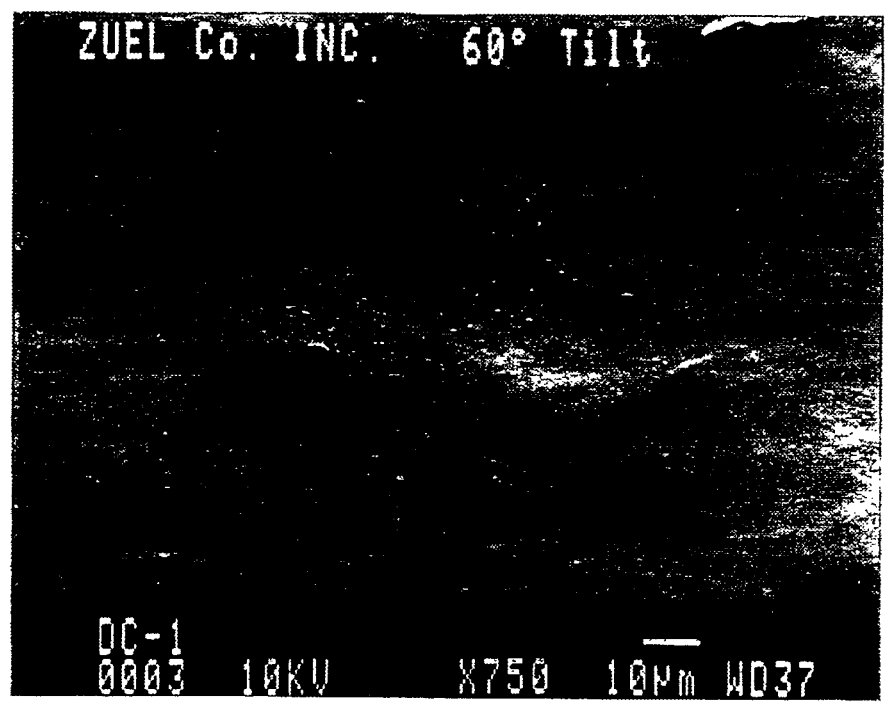
FIGS. 12 and 13 are scanning electron monographs of a diffusion etched glass surface.
Figure 13:
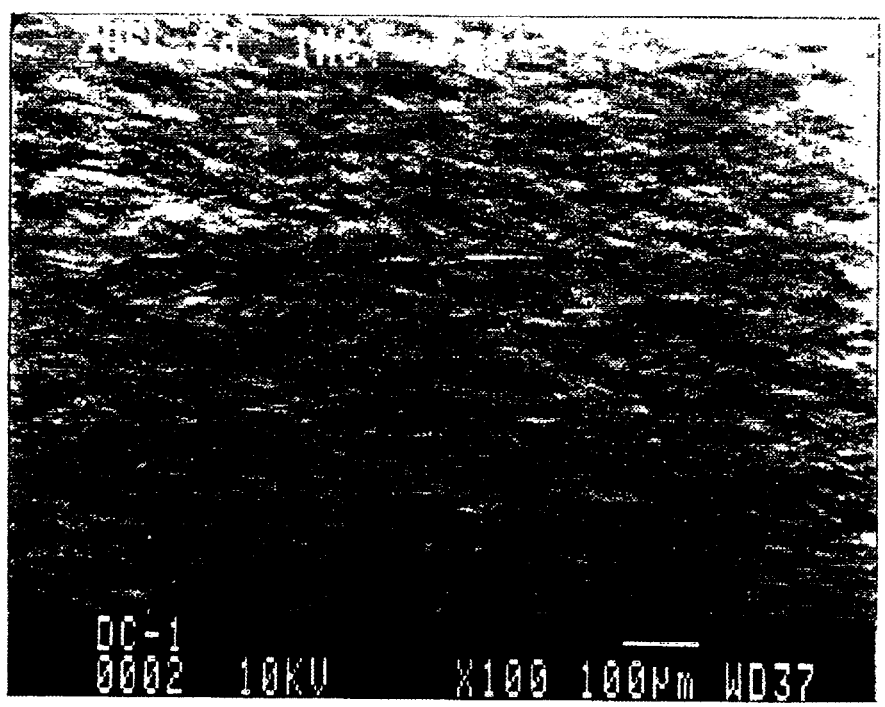

FIGS. 12 and 13 show a glass plate diffusion etched according to the present invention, having an island density of about 560 islands per square millimeter. While substantially rougher than the diffusion etched glass of FIGS. 6 and 9, this glass was found to still provide surprisingly high clarity with low reflectance after AR treatment.

Figure 14:
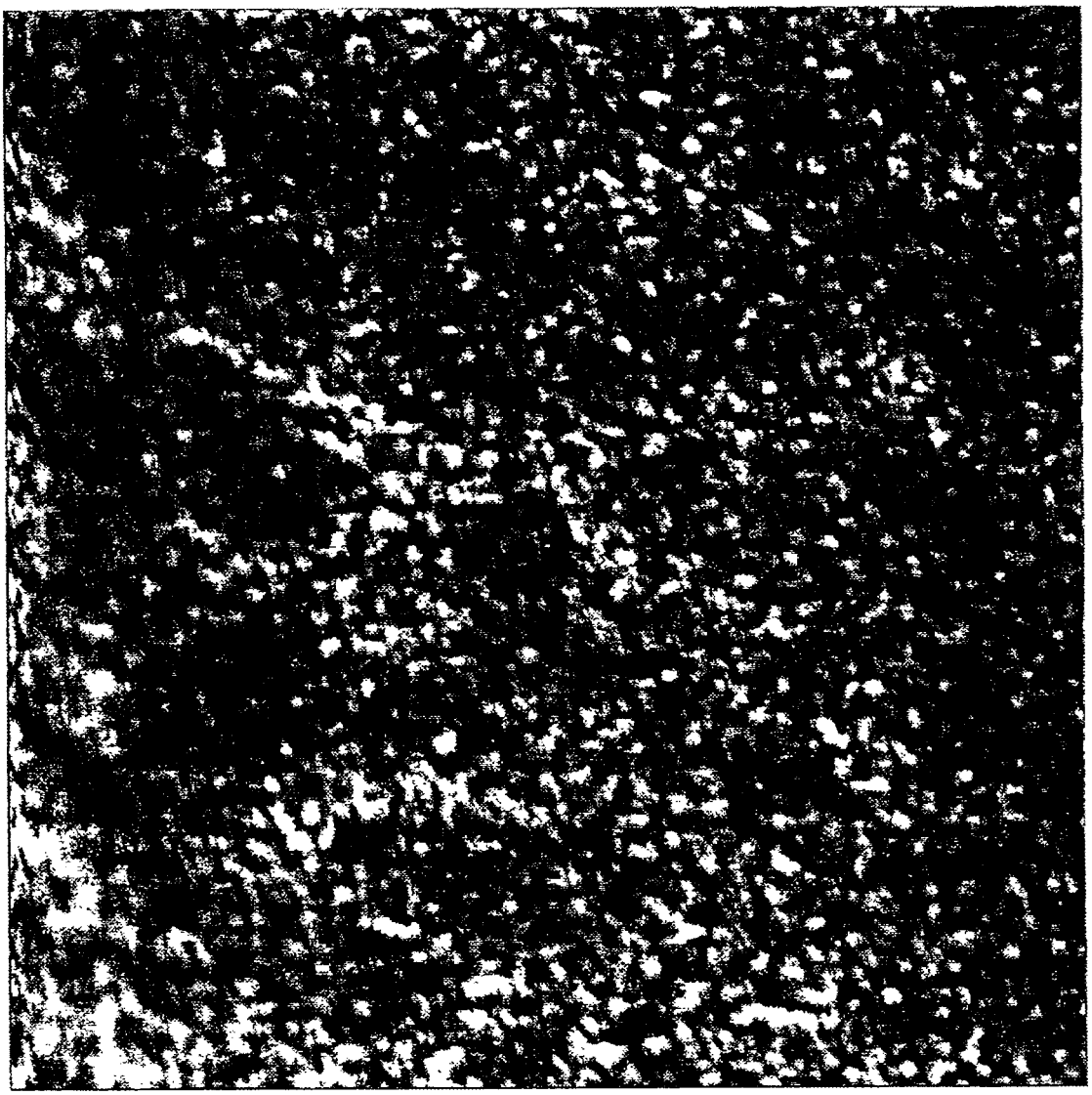
FIG. 14 is a scanning electron monograph of the glass surface's secondary raised and lowered surfaces as formed by prior art processes.
Figure 15:
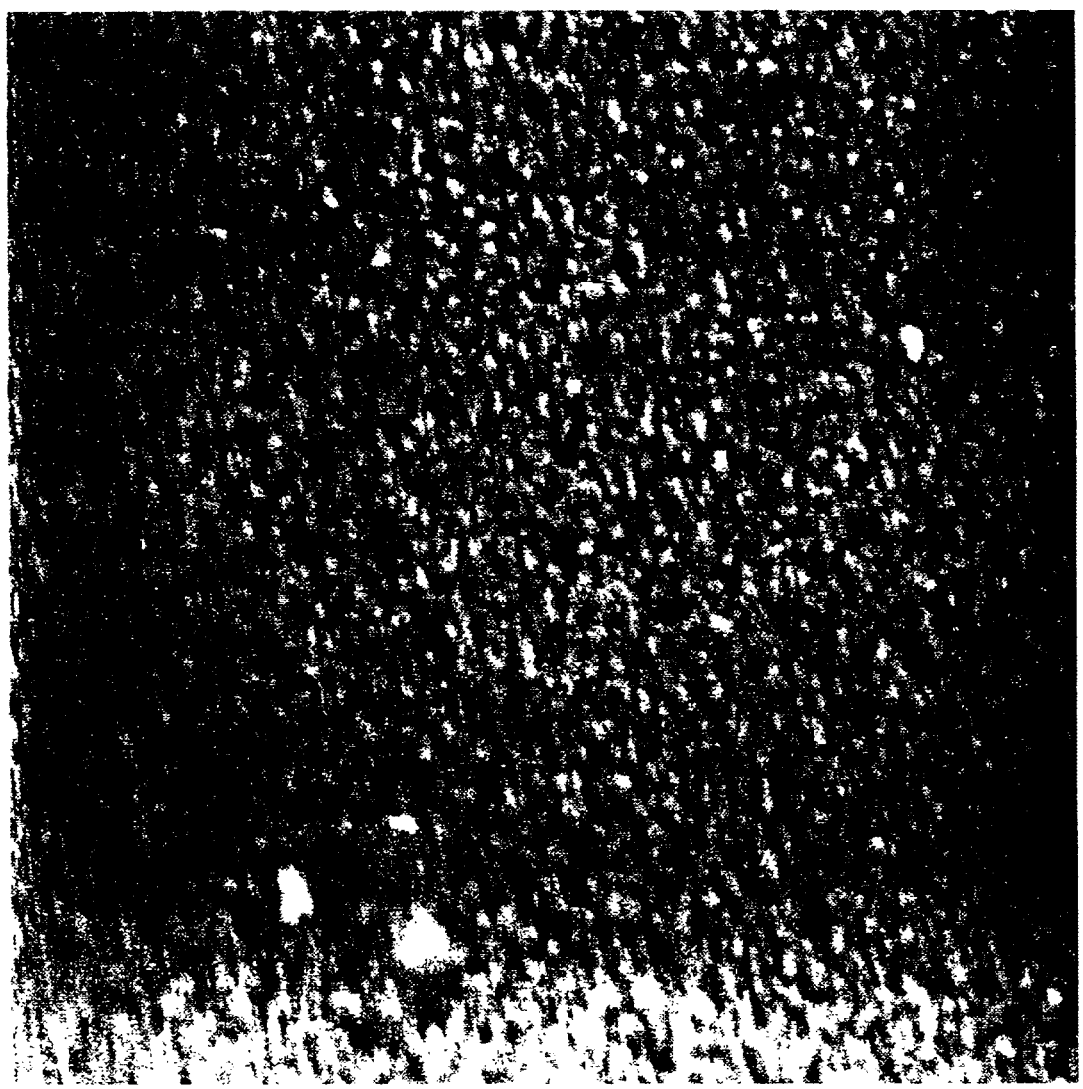
FIG. 15 is a scanning electron monograph of the glass surface's secondary raised and lowered surfaces as formed by the currently preferred exemplary embodiment.

Lastly, FIGS. 14 and 15 are SEM pictures, taken at 100,000× magnification, showing the skeletal silica structure, or secondary raised surfaces, and and openings, or secondary lowered surfaces, across the glass surface. FIG. 14 shows the prior art AR glass surface and FIG. 15 shows the AR glass surface of the present invention. A comparison of FIGS. 14 and 15 illustrate that the size of the skeletal silica structure and the openings in the structure differ. In FIG. 14, both the structure and the openings are about 200 to about 600 angstroms in diameter. However, for the present invention, the skeletal structure is about 100 to about 400 angstroms in diameter and the openings are about 100 to about 200 angstroms in diameter. The density of the skeletal structure is about 30 to about 40 skeletal structures per 200 nanometer square for the prior art, and 50 to about 70 skeletal structures per 200 nanometer square for the present invention. It is believed that the smaller size of both the skeletal structure and the openings and the more densely packed skeletal structure of the preferred embodiment are responsible for keeping grease marks and other contaminates on the glass surface instead of being trapped in the lower surfaces. Thus, since the contaminates are kept on the surface of the glass, the surface can be cleaned with household glass cleaner and with minimal effort.

EXAMPLE 1

A plate of soda-lime glass having a composition of 14% soda and 9% lime, obtained from PPG Industries, is first cleaned in a pre-etching acid solution which removes a weathered layer of material from the glass surface. The pre-etching acid solution consists of 2% by weight hydrofluoric acid, with the glass plate immersed in this solution for two minutes, at room temperature. The glass is then removed from the pre-etching acid solution and rinsed, preferably with water.

The pre-etched glass plate is then dipped in a diffusion etching aqueous solution including 430 milliliters per liter of 70% hydrofluoric acid, 80 grams per liter of ammonium bifluoride, and 500 grams per liter of sorbitol. The glass is dipped once in the solution at 30 seconds per dip at a temperature of 20° C. The plate is rinsed with water after each dip.

The glass plate is then preheated to 52° C. and thereafter immersed in an anti-reflection acid solution. The solution comprising about 15% by weight fluorosilicic acid and about 12 to 15 grams hydrated silica added, depending on solubility of the silica in the acid. Also, either a hydrofluoric acid or fluoride salt may be added to obtain a positive potency or boric acid may be added to obtain a negative potency. The solution used with this example included 4 milliliters of 4% boric acid to obtain a negative potency of 8. The glass was immersed in the anti-reflection acid solution for 46 minutes at a temperature of 45° C. and was agitated. The glass was then rinsed, dipped in a neutralizing solution, for example, about 5% sodium hydroxide, to remove any residual acid on the surface and then rinsed and dried.

Glass treated on both surfaces, utilizing the preferred embodiment, has a reflectance of 0.5–0.9%, with common glass being 8%, which is approximately a 91% change in reflectance. The glass structure of the present invention has a transmittance of about 97%, which is superior to common glass which has a transmittance of about 90.5% (3/32" thick glass sheet). This is due to the AR etching on the glass surface which increases light transmittance.

Utilizing the combination of surface structures, including islands and a skeletal structure of silica, may produce a glass sheet which has extremely high clarity with extremely low reflectance and may be produced in an economic operation. Glass products produced according to the present invention can be used in picture frames, t.v. screens, computer screens and in various other applications where a low reflectance is required combined with high clarity. The glass structures of the present invention are particularly suited for high-volume applications due to the low cost of processing, with particular adaptability for use in picture frames to enhance the ability of a person to view the picture enclosed therein without distortion or glare.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A glass product comprising an alkali or alkali earth metal silicate glass, said glass product having high optical clarity and comprising at least one surface comprising:
    a plurality of islands extending across said surface of said glass at a density of about 60 to about 10,000 islands per square millimeter and each island being between about 10 to about 200 micrometers in diameter and said islands extending across said entire surface of said glass in such a distribution that said islands contribute to providing decreased reflectance of incident light across said surface of said glass;
    a skeletized silica structure having openings and extending uniformly over the surface of the glass, including the islands, said skeletized structure is about 100 to about 400 angstroms in diameter
    said openings are about 100 to about 200 angstroms in diameter and uniformly distributed throughout the surface of the glass,
    wherein the density of said skeletized structure is about 50 to about 70 skeletized structures per 200 nanometers square of said surface; and
    the product having low reflectance of incident light.

2. The glass of claim 1, wherein said islands are disposed on said glass surface at a density of about 250 to about 600 islands per square millimeter of said glass surface.

3. The glass of claim 1, wherein said product comprises a plane sheet.

4. The glass of claim 1, wherein said product comprises a curved sheet.

* * * * *